US011000432B2

(12) United States Patent
Katsura et al.

(10) Patent No.: US 11,000,432 B2
(45) Date of Patent: May 11, 2021

(54) MOVING DEVICE

(71) Applicant: EXEDY Corporation, Neyagawa (JP)

(72) Inventors: Hitoshi Katsura, Neyagawa (JP);
Kazuhito Maeda, Neyagawa (JP);
Taichi Kitamura, Neyagawa (JP);
Chika Baba, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 90 days.

(21) Appl. No.: 16/290,286

(22) Filed: Mar. 1, 2019

(65) Prior Publication Data
US 2019/0269566 A1  Sep. 5, 2019

(30) Foreign Application Priority Data
Mar. 5, 2018 (JP) .............................. JP2018-038701

(51) Int. Cl.
*A61G 5/04* (2013.01)
*A61G 5/10* (2006.01)
*B62B 5/08* (2006.01)

(52) U.S. Cl.
CPC ............... *A61G 5/04* (2013.01); *A61G 5/042* (2013.01); *A61G 5/10* (2013.01); *B62B 5/087* (2013.01);
(Continued)

(58) Field of Classification Search
CPC . A61G 5/04; A61G 5/042; A61G 5/10; A61G 2203/36; A61G 2203/70;
(Continued)

(56) References Cited

U.S. PATENT DOCUMENTS 4,770,431 A * 9/1988 Kulik ..................... A61G 5/003
280/202
4,789,175 A * 12/1988 Schramm ............... A61G 5/003
280/282
(Continued)

FOREIGN PATENT DOCUMENTS

JP  2004-188076 A  7/2004
JP  2005-176980 A  7/2005
(Continued)

OTHER PUBLICATIONS

Notice of Allowance of the corresponding Japanese Application No. 2018-038701, dated Feb. 25, 2020, 3 pp.
(Continued)

*Primary Examiner* — Jacob B Meyer
(74) *Attorney, Agent, or Firm* — United IP Counselors, LLC

(57) ABSTRACT

A moving device adapted to be actuated by a prime mover is disclosed. The moving device allows a caregiver to ride thereon. The moving device comprises a vehicle body and a plurality of rotors. The vehicle body includes a first frame portion and a second frame portion. The first frame portion allows the caregiver to ride thereon and the second frame portion allows a care receiver to ride thereon. The plurality of rotors are provided on the first frame portion and are rotatable in accordance with movement of the vehicle body. A wheel base defined by the plurality of rotors is constant. The second frame portion is provided on the first frame portion so as to be movable in accordance with a motion of the caregiver riding on and getting off the first frame portion.

14 Claims, 11 Drawing Sheets

(52) U.S. Cl.
CPC ...... *A61G 2203/10* (2013.01); *A61G 2203/14* (2013.01); *A61G 2203/36* (2013.01); *A61G 2203/70* (2013.01); *B60Y 2200/84* (2013.01)

(58) Field of Classification Search
CPC ............ A61G 2203/10; A61G 2203/14; B62B 5/087; B60Y 2200/84
See application file for complete search history.

(56) References Cited

U.S. PATENT DOCUMENTS

| | | | | |
|---|---|---|---|---|
| 4,830,388 | A * | 5/1989 | Wang | A61G 5/003 280/202 |
| 5,927,730 | A * | 7/1999 | Sattler | B62B 5/002 280/47.131 |
| 6,105,706 | A | 8/2000 | Cooper | |
| 6,341,791 | B1 * | 1/2002 | Cannon, Sr. | A61G 5/003 280/204 |
| 6,443,252 | B1 * | 9/2002 | Andes | A61G 5/10 180/65.1 |
| 7,004,272 | B1 * | 2/2006 | Brown | B60K 1/00 180/65.1 |
| 7,971,893 | B1 | 7/2011 | Dunn | |
| 8,006,786 | B1 * | 8/2011 | Chapman | A61G 5/1094 180/65.1 |
| 8,113,305 | B1 * | 2/2012 | Flowers | A61G 5/128 180/19.1 |
| 8,573,625 | B2 * | 11/2013 | Gramme | B62K 27/003 280/401 |
| 9,150,271 | B1 * | 10/2015 | Liu | B62K 7/00 |
| 9,428,239 | B1 * | 8/2016 | Bell | B62B 7/12 |
| 9,469,323 | B2 * | 10/2016 | Lin | B62B 3/001 |
| 9,869,999 | B2 * | 1/2018 | Doane | G05D 1/0255 |
| 10,180,329 | B2 * | 1/2019 | Doane | A63B 55/61 |
| 10,183,719 | B2 * | 1/2019 | McManus | B62K 27/003 |
| 10,197,999 | B2 * | 2/2019 | Doane | G05D 1/0278 |
| 10,331,126 | B2 * | 6/2019 | Doane | G05D 1/028 |
| 10,649,451 | B2 * | 5/2020 | Doane | A63B 55/61 |
| 10,689,021 | B2 * | 6/2020 | Deshpande | B62B 5/002 |
| 2006/0261575 | A1 * | 11/2006 | Ehrenreich | B62K 7/00 280/643 |
| 2013/0098700 | A1 * | 4/2013 | Zhang | G05D 1/0255 180/167 |
| 2015/0327638 | A1 * | 11/2015 | Ghosh | A45C 13/00 180/167 |
| 2017/0050659 | A1 * | 2/2017 | Cardano | B62B 5/046 |
| 2017/0108860 | A1 * | 4/2017 | Doane | G05D 1/0212 |
| 2018/0173223 | A1 * | 6/2018 | Doane | G05D 1/0255 |
| 2019/0038486 | A1 * | 2/2019 | Sato | A61G 5/10 |
| 2019/0041848 | A1 * | 2/2019 | Doane | G05D 1/0278 |
| 2019/0046373 | A1 * | 2/2019 | Coulter | H04W 12/003 |
| 2019/0060144 | A1 * | 2/2019 | St-Cyr | A61G 5/061 |
| 2019/0142660 | A1 * | 5/2019 | Sasai | A61G 5/045 180/65.1 |
| 2019/0269566 | A1 * | 9/2019 | Katsura | A61G 5/04 |
| 2019/0298593 | A1 * | 10/2019 | Katsura | A61G 5/04 |
| 2020/0097002 | A1 * | 3/2020 | Doane | G05D 1/0278 |

FOREIGN PATENT DOCUMENTS

| | | |
|---|---|---|
| JP | 3131746 U | 5/2007 |
| WO | 2017/143454 A1 | 8/2017 |

OTHER PUBLICATIONS

Extended European Search Report dated May 23, 2019 for corresponding European Application No. 19159714.5, 8 pp.

* cited by examiner

MOVING DEVICE

CROSS-REFERENCE TO RELATED APPLICATIONS

This application claims priority to Japanese Patent Application No. 2018-038701, filed Mar. 5, 2018. The contents of that application are incorporated by reference herein in their entirety.

BACKGROUND

Technical Field

The present invention relates to a moving device, particularly to a moving device that enables a caregiver to ride thereon and is capable of being actuated by a prime mover.

Background Art

A type of well-known moving devices (e.g., electric wheelchairs) proposed so far enables a caregiver and a care receiver to ride thereon (see Japan Laid-open Patent Application Publications Nos. 2004-188076 and 2005-176980). In the electric wheelchairs described in the publications, a riding portion (6, 11) for a caregiver is attached to a vehicle body (1, 1) on which a care receiver rides.

In the well-known electric wheelchairs, the riding portion for the caregiver is provided as an additional component to the vehicle body. This leaves concern that increase in size of the well-known electric wheelchairs is inevitable. Moreover, in the well-known electric wheelchairs, change in balance of the center of gravity occurs between a condition that the caregiver rides on the riding portion and a condition that the caregiver gets off the riding portion. Hence, it is difficult to stably actuate the well-known electric wheelchairs.

BRIEF SUMMARY

The present invention is made in view of the aforementioned drawbacks. It is an object of the present invention to provide a moving device realized in compact size. Besides, it is another object of the present invention to provide a moving device capable of being stably actuated.

A moving device according to an aspect of the present invention is a moving device that is enabled to be actuated by a prime mover and enables a caregiver to ride thereon. The moving device includes a vehicle body and a plurality of rotors (a plurality of rolling elements).

The vehicle body includes a first frame portion and a second frame portion. The first frame portion enables the caregiver to ride thereon. The second frame portion enables a care receiver taken care of by the caregiver to ride thereon. The plurality of rotors are provided on the first frame portion, and are rotatable in movement of the vehicle body. Here, a wheel base defined by a distance between axes of the plurality of rotors is constant. The second frame portion is provided on the first frame portion so as to be movable in accordance with a motion of the caregiver riding on and getting off the first frame portion.

The present moving device enables both the caregiver and the care receiver to ride thereon or enables only the care receiver to ride thereon by moving the second frame portion with respect to the first frame portion. Thus, the present moving device is not required to be provided with a riding portion for the caregiver as an additional portion. Hence, the present moving device can be realized in compact size.

Moreover, the present moving device enables not only the care receiver but also the caregiver to rider thereon only by moving the second frame portion with respect to the first frame portion. This makes it possible to stably actuate an electric wheelchair.

In a moving device according to another aspect of the present invention, the vehicle body preferably further includes a support portion. The support portion is capable of supporting the caregiver and is provided on the first frame portion. With this configuration, the moving device can be stably actuated.

In a moving device according to another aspect of the present invention, the support portion is preferably attached to an upper part of the first frame portion so as to be detachable therefrom. In this case, the support portion is detached from and storable in the vehicle body when the caregiver gets off the vehicle body. With this configuration, the moving device can be realized in compact size.

In a moving device according to another aspect of the present invention, the support portion is preferably foldable when the caregiver gets off the vehicle body. With this configuration, the moving device can be realized in compact size.

In a moving device according to another aspect of the present invention, the vehicle body preferably further includes a restriction portion. The restriction portion restricts the second frame portion from moving with respect to the first frame portion. With this configuration, the moving device can be stably actuated in both situations when both the caregiver and the care receiver ride thereon and when only the care receiver rides thereon.

In a moving device according to another aspect of the present invention, the plurality of rotors are preferably formed by at least three rotors. With this configuration, the moving device can be stably actuated.

In a moving device according to another aspect of the present invention, the plurality of rotors preferably include a first rotor and a second rotor. The first rotor is provided on the first frame portion so as to be rotatable about a first rotational axis. The second rotor is provided on the first frame portion so as to be rotatable about a second rotational axis disposed at a predetermined interval from the first rotational axis. The prime mover drives at least one of the first rotor and the second rotor. With this configuration, the moving device can be preferably and suitable actuated.

In a moving device according to another aspect of the present invention, the vehicle body is preferably configured such that a center of gravity of the caregiver and a center of gravity of the care receiver are disposed within the wheel base when the caregiver and the care receiver ride on the vehicle body. With this configuration, the moving device can be stably actuated.

A moving device according to another aspect of the present invention preferably further includes a control device capable of controlling at least one of the plurality of rotors. With this configuration, the moving device can be stably actuated.

A moving device according to another aspect of the present invention preferably further includes a first sensor. The first sensor is provided for detecting an object related to derailing of at least one of the plurality of rotors. The control device herein includes a first controller. The first controller controls the at least one of the plurality of rotors so as to avoid the derailing when the first sensor detects the object related to the derailing. With this configuration, the moving device can be more stably actuated.

A moving device according to another aspect of the present invention preferably further includes a second sensor. The second sensor is provided for detecting an object related to contact of the vehicle body. The control device herein includes a second controller. The second controller controls the at least one of the plurality of rotors so as to avoid the contact when the second sensor detects the object related to the contact. With this configuration, the moving device can be more stably actuated.

A moving device according to another aspect of the present invention preferably further includes a third sensor. The third sensor is provided for detecting a position of the caregiver with respect to the vehicle body. The control device herein includes a third controller. The third controller stops the prime mover when a distance between the caregiver and the vehicle body becomes greater than or equal to a predetermined distance. In this case, the prime mover is stopped when the caregiver separates from the vehicle body at the predetermined distance or greater. With this configuration, security of the moving device can be reliably ensured.

A moving device according to another aspect of the present invention preferably further includes a switch portion for operating turning on and off the prime mover. With this configuration, safety of the moving device can be reliably ensured.

Overall, according to the present invention, a moving device can be realized in compact size and can be stably actuated.

DETAILED DESCRIPTION OF EMBODIMENTS

First Preferred Embodiment

Figure 1:
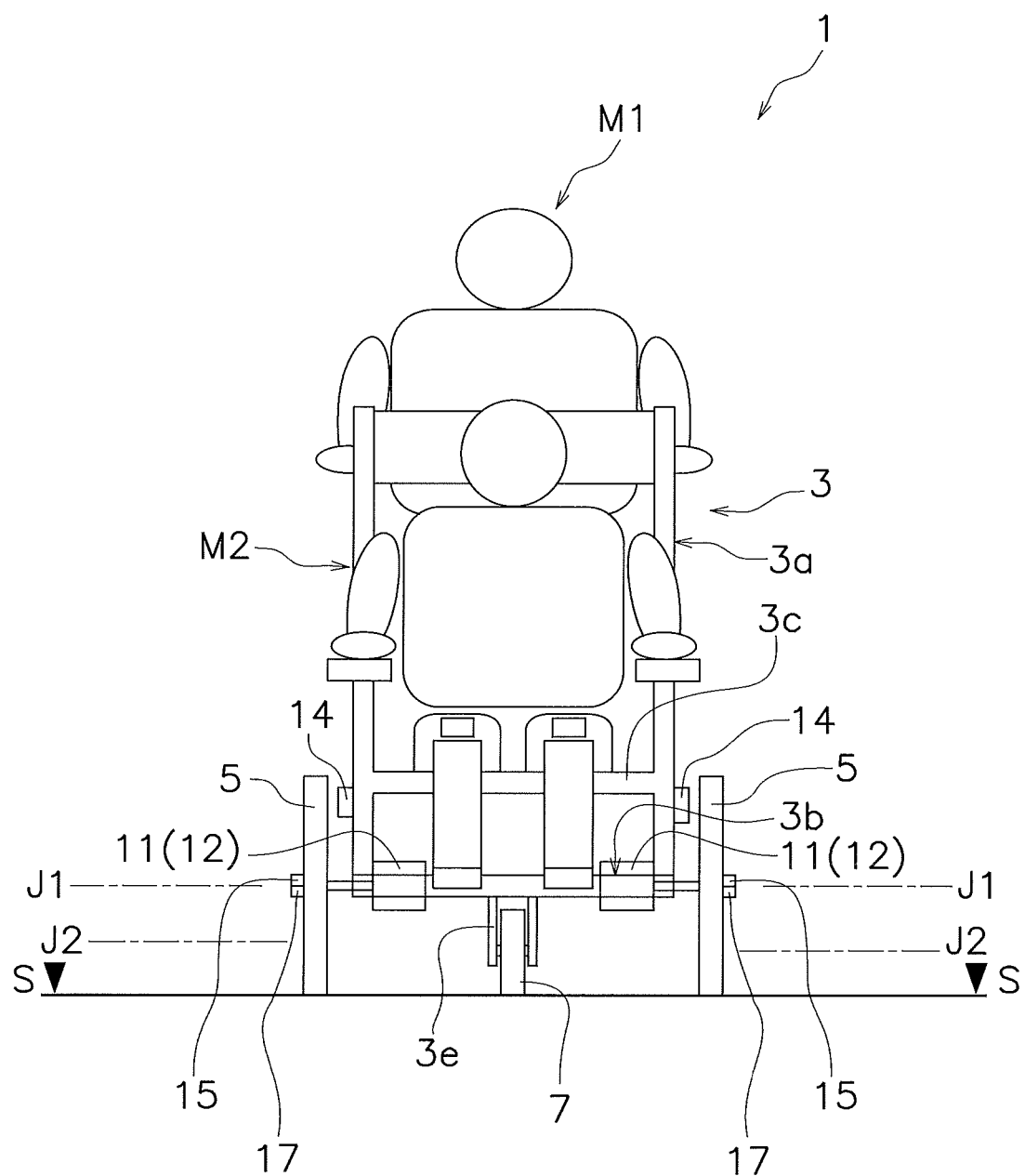
FIG. 1 is a front view of an electric wheelchair employing a first preferred embodiment of the present invention.

As shown in FIG. 1, an electric wheelchair 1 (exemplary moving device), employing a preferred embodiment of the present invention, is configured to enable a caregiver M1 to get thereon and is also configured to be capable of being actuated by a prime mover 11. Additionally, the electric wheelchair 1 is configured to be movable forward and backward. Furthermore, the electric wheelchair 1 is configured to be changeable in traveling direction and speed by an operating device 13 (to be described).

Figure 2A:
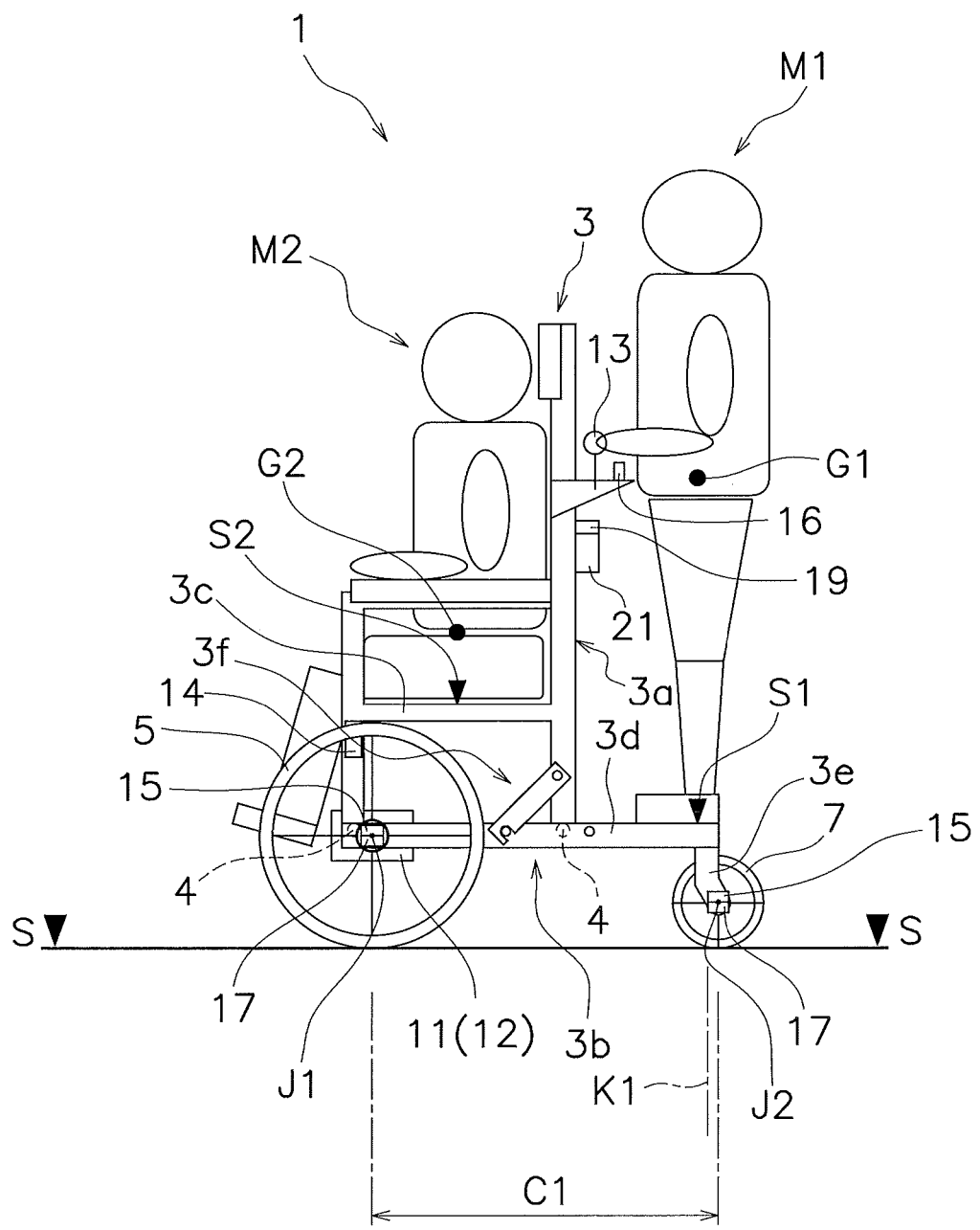
FIG. 2A is a side view of the electric wheelchair employing the first preferred embodiment of the present invention.
Figure 2B:
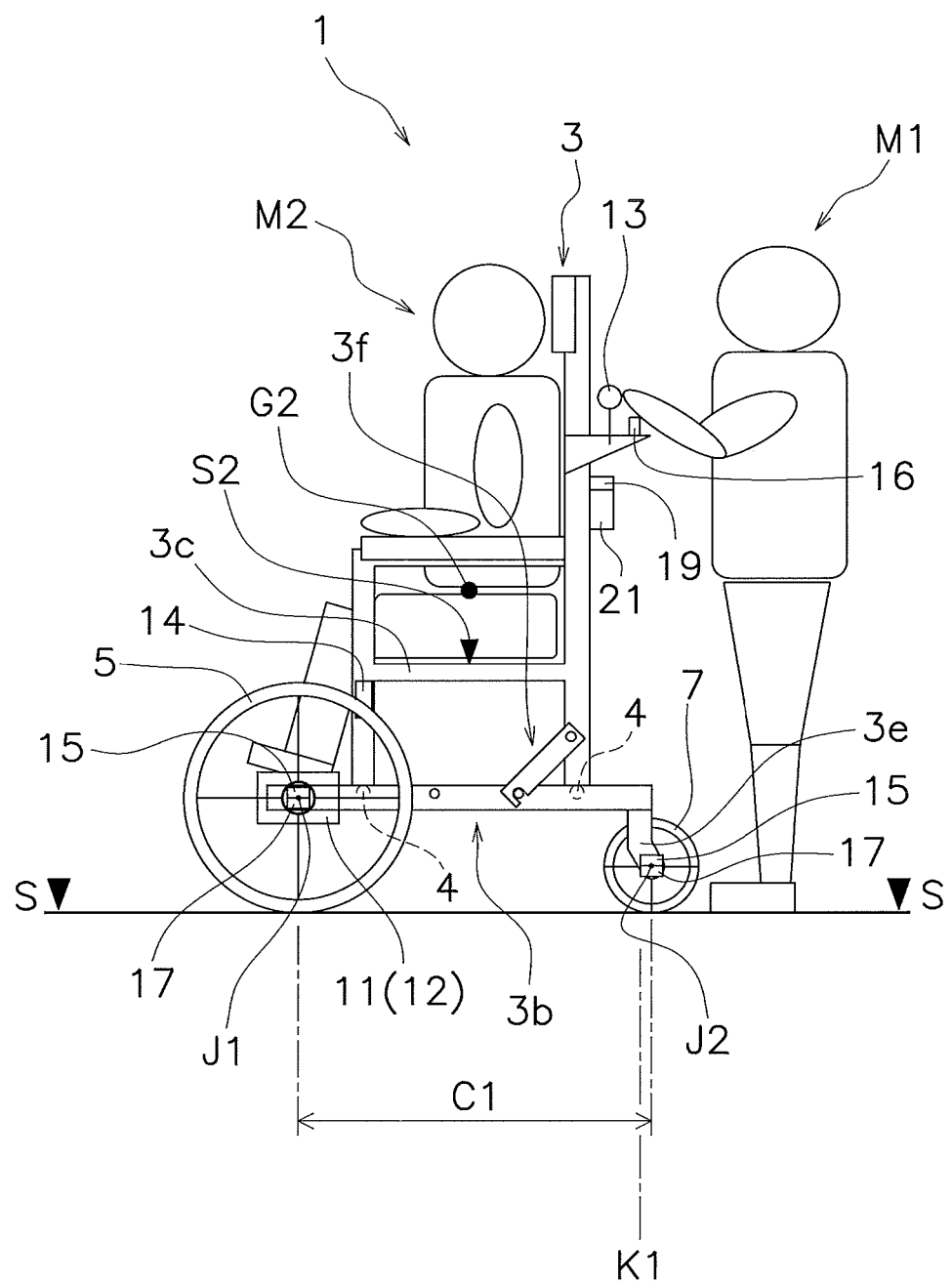
FIG. 2B is a side view of the electric wheelchair employing the first preferred embodiment of the present invention.

As shown in FIGS. 1, 2A and 2B, the electric wheelchair 1 includes a vehicle body 3, a pair of front wheels 5 (exemplary first rotor) and a rear wheel 7 (exemplary second rotor). It should be noted that the front wheels 5 and the rear wheel 7 are exemplary plural rotors, and are preferably composed of at least three rotors.

Additionally, the electric wheelchair 1 further includes the prime mover 11 (exemplary prime mover). Moreover, the electric wheelchair 1 further includes the operating device 13. Furthermore, the electric wheelchair 1 further includes a switch portion 16.

Besides, the electric wheelchair 1 further includes at least one vehicle speed detection sensor 14. Moreover, the electric wheelchair 1 includes at least one object sensor 15 (exemplary second sensor), at least one step sensor 17 (exemplary first sensor) and a position recognition sensor 19 (exemplary third sensor). Furthermore, the electric wheelchair 1 further includes a control device 21.

<Vehicle Body>

As shown in FIGS. 1, 2A and 2B, the vehicle body 3 is configured to enable a care receiver M2 and the caregiver M1 who takes care of the care receiver M2 to ride thereon. The posture of the vehicle body 3 is changeable between a first posture and a second posture. The first posture enables both the caregiver M1 and the care receiver M2 to ride on the vehicle body 3. The second posture enables only the care receiver M2 to ride on the vehicle body 3.

A wheel base C1 of the vehicle body 3 is constant. In other words, the wheel base C1 of the vehicle body 3 is set to a predetermined length. The wheel base C1 is defined as an interval between a first rotational axis J1 of the front wheels 5 and a second rotational axis J2 of the rear wheel 7.

The vehicle body 3 is configured to locate both a center of gravity G1 of the caregiver M1 and a center of gravity G2 of the care receiver M2 within the wheel base C1 when the caregiver M1 and the care receiver M2 ride on the vehicle body 3 (see FIG. 2A).

Specifically, the vehicle body 3 is configured to locate a point of action S1 within the wheel base C1. The point of action S1 is a point at which the mass of the caregiver M1 acts on the vehicle body 3 in the vertical direction. The vehicle body 3 is also configured to locate a point of action S2 within the wheel base C1. The point of action S2 is a point at which the mass of the care receiver M2 acts on the vehicle body 3 in the vertical direction. It should be noted that the points of actions S1 and S2 can be interpreted as points at which straight lines, extending from the centers of gravity G1 and G2 in the vertical direction, intersect with a plane arranged in parallel to a traveling surface S in a range between the first rotational axis J1 and the second rotational axis J2.

The vehicle body configuration will be hereinafter explained. As shown in FIGS. 1, 2A and 2B, the vehicle body 3 includes a first frame portion 3*a* (exemplary second frame portion in appended claims) and a second frame portion 3b (exemplary first frame portion in appended claims). The vehicle body 3 further includes a lock portion 3f (exemplary restriction portion).

(First Frame Portion)

As shown in FIGS. 1, 2A and 2B, the first frame portion 3a is configured to enable the care receiver M2 who is taken care of by the caregiver M1 to ride thereon. The first frame portion 3a is provided with a seat portion 3c enabling the care receiver M2 to be seated thereon.

The first frame portion 3a is provided on the second frame portion 3b so as to be movable in accordance with the motion of the caregiver M1 riding on and getting off the second frame portion 3b.

The first frame portion 3a is movable between a first position (see FIG. 2A) and a second position (see FIG. 2B) with respect to the second frame portion 3b. The first position enables both the caregiver M1 and the care receiver M2 to ride on the vehicle body 3. The second position enables only the care receiver M2 to ride on the vehicle body 3. When the first frame portion 3a is disposed in the first position, the vehicle body 3 takes the first posture described above. When the first frame portion 3a is disposed in the second position, the vehicle body 3 takes the second posture described above.

For example, at least one rolling element (e.g., a plurality of rollers 4) is attached to either the first frame portion 3a or the second frame portion 3b. In the present preferred embodiment, the plural rollers 4 are attached to the first frame portion 3a. The plural rollers 4 roll on the second frame portion 3b, whereby the first frame portion 3a becomes movable between the first and second positions described above with respect to the second frame portion 3b.

The present preferred embodiment has exemplified the configuration that the first frame portion 3a is moved with respect to the second frame portion 3b through the plural rollers 4. It should be noted, however, that the first frame portion 3a can be directly moved with respect to the second frame portion 3b without using such rolling elements as the rollers 4 so long as the first frame portion 3a is movable with respect to the second frame portion 3b.

Now, as shown in FIG. 2A, when the first frame portion 3a is disposed in the first position and the caregiver M1 and the care receiver M2 ride on the second frame portion 3b (a riding portion 3d) and the first frame portion 3a (the seat portion 3c), respectively, the center of gravity G1 (the point of action S1) of the caregiver M1 and the center of gravity G2 (the point of action S2) of the care receiver M2 are located within the wheel base C1. Specifically in this case, a center of gravity G0 (a point of action S0) of the caregiver M1 and the care receiver M2 is located in substantially the middle of the wheel base C1.

By contrast, as shown in FIG. 2B, when the first frame portion 3a is disposed in the second position and only the care receiver M2 rides on the first frame portion 3a (the seat portion 3c), the center of gravity G2 (the point of action S2) of the care receiver M2 is located within the wheel base C1. Specifically in this case, the center of gravity G2 (the point of action S2) of the care receiver M2 is located in substantially the middle of the wheel base C1.

(Second Frame Portion)

As shown in FIGS. 1, 2A and 2B, the second frame portion 3b is configured to enable the caregiver M1 to ride thereon. The second frame portion 3b is provided with the riding portion 3d that enables the caregiver M1 to ride thereon.

The riding portion 3d is provided on the second frame portion 3b so as to be disposed between the pair of front wheels 5 and the rear wheel 7. Detailedly, when the first frame portion 3a is disposed in the second position, the riding portion 3d is provided on the second frame portion 3b so as to be disposed between the first frame portion 3a and the rear wheel 7 (the second rotational axis J2).

(Lock Portion)

The lock portion 3f restricts the first frame portion 3a from moving with respect to the second frame portion 3b. Detailedly, the lock portion 3f restricts the first frame portion 3a from moving with respect to the second frame portion 3b in the first position and the second position. In other words, the posture of the vehicle body 3 is kept in either the first posture or the second posture by the lock portion 3f.

The lock portion 3f is provided between the first frame portion 3a and the second frame portion 3b. For example, the lock portion 3f is a member elongated in one direction. The lock portion 3f is pivotably attached at one end thereof to one of the first and second frame portions 3a and 3b. The lock portion 3f is configured to be capable of being engaged at the other end thereof with the other of the first and second frame portions 3a and 3b.

In the present preferred embodiment, the lock portion 3f is pivotably attached at one end thereof to the first frame portion 3a through a coupling member such as a pin member. The lock portion 3f is configured to be capable of being engaged at the other end thereof with the second frame portion 3b. The lock portion 3f herein includes an engaging portion (not shown in the drawings) in the other end thereof, whereas the second frame portion 3b includes an engaged portion (not shown in the drawings). The engaging portion and the engaged portion can be arbitrarily configured as long as the both portions are capable of restricting the first frame portion 3a from moving with respect to the second frame portion 3b.

When the lock portion 3f is herein disengaged, the first frame portion 3a becomes movable with respect to the second frame portion 3b as described above. In other words, when the lock portion 3f is disengaged, the posture of the vehicle body 3 becomes changeable between the first posture and the second posture.

<Front Wheels>

As shown in FIGS. 1, 2A and 2B, the pair of front wheels 5 is, for instance, vehicle wheels. The pair of front wheels 5 is provided on the vehicle body 3 so as to be rotatable in movement of the vehicle body 3. Each of the pair of front wheels 5 is herein rotatably attached to the second frame portion 3b. The pair of front wheels 5 makes contact with the ground while being attached to the second frame portion 3b.

Each of the pair of front wheels 5 has the first rotational axis J1. The pair of front wheels 5 is disposed in opposition in the extending direction of the first rotational axis J1 (see FIG. 1). The pair of front wheels 5 is provided on the vehicle body 3 (e.g., the second frame portion 3b) so as to be rotatable about the first rotational axis J1. Detailedly, the pair of front wheels 5 is provided on the second frame portion 3b through a shaft portion so as to be rotatable about the first rotational axis J1. In this condition, the pair of front wheels 5 is rotatable while in contact with the traveling surface S.

<Rear Wheel>

As shown in FIGS. 1, 2A and 2B, the rear wheel 7 is, for instance, a vehicle wheel. The rear wheel 7 is attached to the vehicle body 3 (e.g., the second frame portion 3b). The rear wheel 7 is herein disposed at an interval from the pair of front wheels 5. The rear wheel 7 is attached to the second frame portion 3b so as to be rotatable about the second rotational axis J2.

The rear wheel 7 includes the second rotational axis J2. The second rotational axis J2 is disposed at an interval from the first rotational axis J1. The second rotational axis J2 is herein disposed at an interval from the first rotational axis J1 in an orthogonal direction orthogonal to the first rotational axis J1. The orthogonal direction is arranged substantially in parallel to the traveling surface S. The rear wheel 7 is provided on the vehicle body 3 (e.g., the second frame portion 3b) so as to be rotatable about the second rotational axis J2. Detailedly, the rear wheel 7 is attached to the second frame portion 3b through a shaft portion so as to be rotatable about the second rotational axis J2. In this condition, the rear wheel 7 is rotatable while in contact with the traveling surface S.

Additionally, as shown in FIGS. 2A and 2B, the rear wheel 7 is attached to the second frame portion 3b so as to be turnable about an intersecting axis K1 intersecting with the second rotational axis J2. Detailedly, a wheel holding portion 3e is attached to the second frame portion 3b so as to be turnable about the intersecting axis K1. Additionally, the wheel holding portion 3e supports the rear wheel 7 so as to make the rear wheel 7 rotatable about the second rotational axis J2. In other words, the rear wheel 7 is attached to the second frame portion 3b so as to be rotatable about the second rotational axis J2 with respect to the wheel holding portion 3e and be turnable about the intersecting axis K1 with respect to the second frame portion 3b.

The wheel base C1 herein corresponds to the interval between the first rotational axis J1 of the front wheels 5 and the second rotational axis J2 of the rear wheel 7 in a condition that the first rotational axis J1 and the second rotational axis J2 are substantially in parallel to each other.

<Prime Mover>

The prime mover 11 drives at least one of the pair of front wheels 5 and the rear wheel 7. The prime mover 11 herein drives the pair of front wheels 5. The prime mover 11 is composed of, for instance, a pair of motors 12.

As shown in FIGS. 1, 2A and 2B, the pair of motors 12 drives the pair of front wheels 5 on a one-to-one basis. Each of the pair of motors 12 is attached to the vehicle body 3 (e.g., the second frame portion 3b). Each of the pair of motors 12 receives electric supply from a power source (not shown in the drawings) and is thereby actuated. It should be noted that the power source is attached to the vehicle body 3 (e.g., the first frame portion 3a).

The front wheels 5 are driven independently from each other by actuation of the respective motors 12. In other words, in the present preferred embodiment, the electric wheelchair 1 employs front wheel drive. With the configuration of the front wheels 5 driven independently from each other by the respective motors 12, the traveling direction of the electric wheelchair 1 is herein determined by difference in rotational speed between the front wheels 5. Additionally, turn and neutral turn are performed by difference in rotational speed between the front wheels 5.

It should be noted that in the example herein described, the pair of front wheels 5 is driven independently from each other by the pair of motors 12, but alternatively, the pair of front wheels 5 can be driven by one motor 12. In this case, for instance, it is preferable that a differential gear is disposed between the motor 12 and the pair of front wheels 5. Additionally, it is preferable that a steering device 18 (see FIGS. 6A and 6B) for steering the rear wheel 7 is attached to the vehicle body 3 (e.g., the second frame portion 3b) whereby the traveling direction of the electric wheelchair 1 is determined by the rear wheel 7. Because of the above, the pair of front wheels 5 can be preferably and suitably driven by even one motor 12.

<Operating Device>

The operating device 13 is used for maneuvering the electric wheelchair 1. As shown in FIGS. 2A and 2B, the operating device 13 is composed of, for instance, such a lever member as a joystick. The operating device 13 is provided on the vehicle body 3 (e.g., the second frame portion 3b). The operating device 13 is herein attached to the rear part of the second frame portion 3b. When the operating device 13 is operated by the caregiver M1, a signal corresponding to operating the operating device 13 is transmitted to the control device 21.

It should be noted that in the example herein described, the operating device 13 is operated by the caregiver M1, but alternatively, an operating device (not shown in the drawings) operable by the care receiver M2 can be provided on the vehicle body 3 (e.g., the first frame portion 3a) as an operating device intended for the care receiver M2 aside from the operating device 13 intended for the caregiver M1.

<Switch Portion>

The switch portion 16 is provided for operating turning on and off the prime mover 11. As shown in FIGS. 2A and 2B, the switch portion 16 is attached to the vehicle body 3 (e.g., the first frame portion 3a). The switch portion 16 is, for instance, a button switch. When the switch portion 16 is being turned on, the prime mover 11 receives electric supply from the power source and actuation thereof is enabled. When the switch portion 16 is being turned off, the prime mover 11 is blocked from receiving electric supply from the power source and actuation thereof is disabled.

<Vehicle Speed Detection Sensors>

A plurality of (e.g., two) vehicle speed detection sensors 14 are provided for detecting the vehicle speed. As shown in FIG. 1, the plural vehicle speed detection sensors 14 are attached to the vehicle body 3. The vehicle speed detection sensors 14 are herein attached to the first frame portion 3a so as to be opposed to the front wheels 5, respectively. Each vehicle speed detection sensor 14 receives electric supply from the power source and is thereby actuated. Each vehicle speed detection sensor 14 detects the rotational speed or angular velocity of each front wheel 5. A signal, corresponding to the rotational speed or angular velocity of each front wheel 5 is transmitted to the control device 21.

<Object Sensors>

As shown in FIGS. 1, 2A and 2B, a plurality of (e.g., four) object sensors 15 are provided for detecting an object related to contact with the vehicle body 3. Detailedly, the object sensors 15 are provided for detecting collision against a moving object and/or a stationary object. The plural object sensors 15 are attached to the vehicle body 3.

Two of the object sensors 15 are herein attached to the both sides of the pair of front wheels 5, for instance, the both ends of the shaft portion by which the front wheels 5 are rotatably supported, respectively. Furthermore, other two of the object sensors 15 are attached to the both ends of the rear wheel 7, for instance, the both ends of the shaft portion by which the rear wheel 7 is rotatably supported, respectively.

Each object sensor 15 receives electric supply from the power source and is thereby actuated. Each object sensor 15 detects the distance to a moving object and/or a stationary object. A signal corresponding to the distance to the moving object and/or the stationary object is transmitted to the control device 21.

<Step Sensors>

As shown in FIGS. 1, 2A and 2B, a plurality of (e.g., four) step sensors 17 are provided for detecting an object related to derailing of at least one of the front wheels 5 and the rear wheel 7. The plural step sensors 17 are attached to the vehicle body 3.

Two of the step sensors 17 are herein attached to the both sides of the pair of front wheels 5, for instance, the both ends of the shaft portion by which the front wheels 5 are rotatably supported, respectively. Furthermore, other two of the step sensors 17 are attached to the both sides of the rear wheel 7, for instance, the both ends of the shaft portion by which the rear wheel 7 is rotatably supported, respectively.

Each step sensor 17 receives electric supply from the power source and is thereby actuated. Each step sensor 17 detects information of the traveling surface S (e.g., the ground) located laterally to the front wheel 5 relevant thereto or information of the traveling surface S (e.g., the ground) located laterally to the rear wheel 7. A signal for identifying the information of the traveling surface S is transmitted to the control device 21.

<Position Recognition Sensor>

The position recognition sensor 19 is provided for detecting the position of the caregiver M1 with respect to the vehicle body 3. The position recognition sensor 19 is attached to the vehicle body 3.

The position recognition sensor 19 is herein attached to the first frame portion 3a. The position recognition sensor 19 detects the position of the caregiver M1, for instance, the distance between the caregiver M1 and the first frame portion 3a. The position recognition sensor 19 receives electric supply from the power source and is thereby actuated. A signal corresponding to the distance between the caregiver M1 and the first frame portion 3a is transmitted to the control device 21.

<Control Device>

As shown in FIGS. 2A and 2B, the control device 21 is attached to the vehicle body 3 (e.g., the first frame portion 3a). The control device 21 is configured to be capable of controlling at least one of the pair of front wheels 5 and the rear wheel 7. The control device 21 is herein configured to be capable of controlling the pair of front wheels 5.

The control device 21 receives signals from the operating device 13, the vehicle speed detection sensors 14, the object sensors 15, the step sensors 17 and the position recognition sensor 19, respectively, and supplies driving electricity to the pair of motors 12. In response, the respective motors 12 are actuated based on the driving electricity, and the pair of front wheels 5 is driven by the motors 12, respectively.

Figure 3:
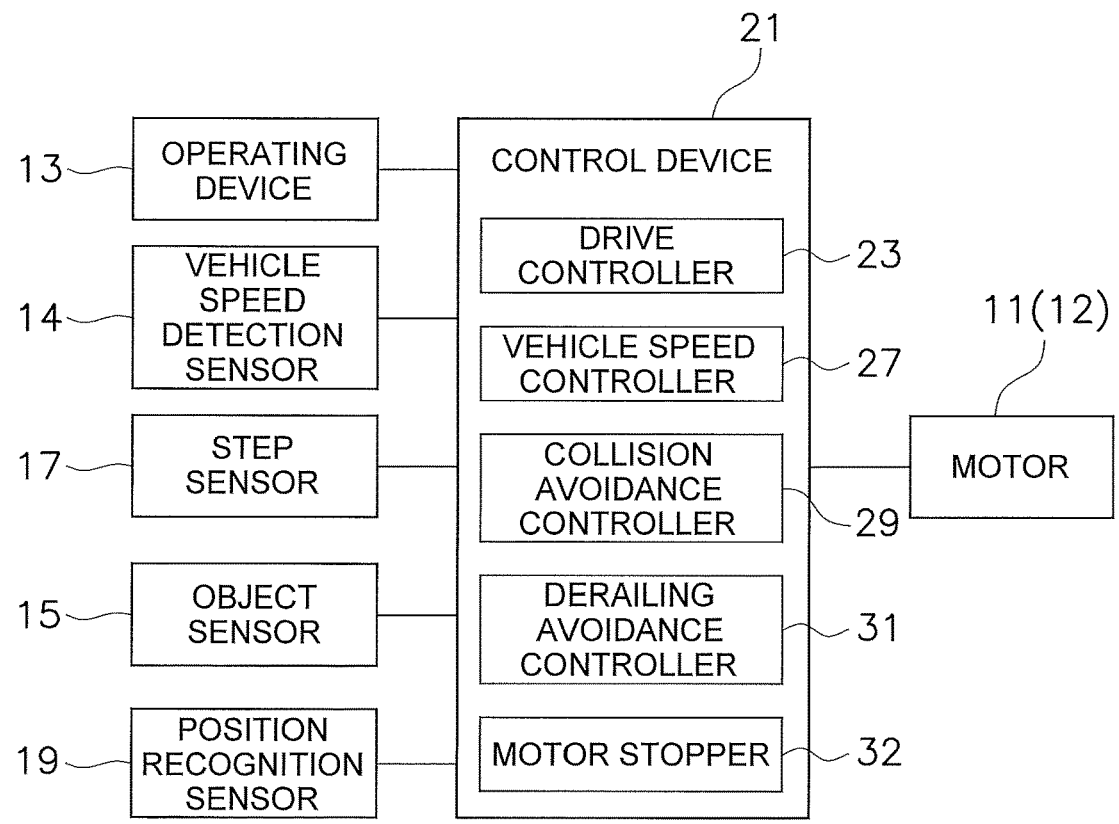
FIG. 3 is a functional block diagram of the electric wheelchair employing the first preferred embodiment of the present invention.

As shown in FIG. 3, the control device 21 includes a drive controller 23, a vehicle speed controller 27, a collision avoidance controller 29 (exemplary second controller), a derailing avoidance controller 31 (exemplary first controller) and a motor stopper 32 (exemplary third controller).

(Drive Controller)

The drive controller 23 shown in FIG. 3 controls the pair of motors 12 based on the signal transmitted thereto from the operating device 13. For example, when the operating device 13 is tilted forward or obliquely forward by the caregiver M1, each of the pair of motors 12 is controlled by the drive controller 23 so as to forwardly move the electric wheelchair 1. On the other hand, when the operating device 13 is tilted backward or obliquely backward by the caregiver M1, each of the pair of motors 12 is controlled by the drive controller 23 so as to backwardly move the electric wheelchair 1.

Yet on the other hand, when the operating device 13 is tilted sideward by the caregiver M1, each of the pair of motors 12 is controlled by the drive controller 23 such that the electric wheelchair 1 performs neutral turn.

Thus, each of the pair of motors 12 is controlled by the drive controller 23 in response to the direction that the operating device 13 is operated. Additionally, the pair of front wheels 5 is driven by the pair of motors 12 on a one-to-one basis.

Figure 4:
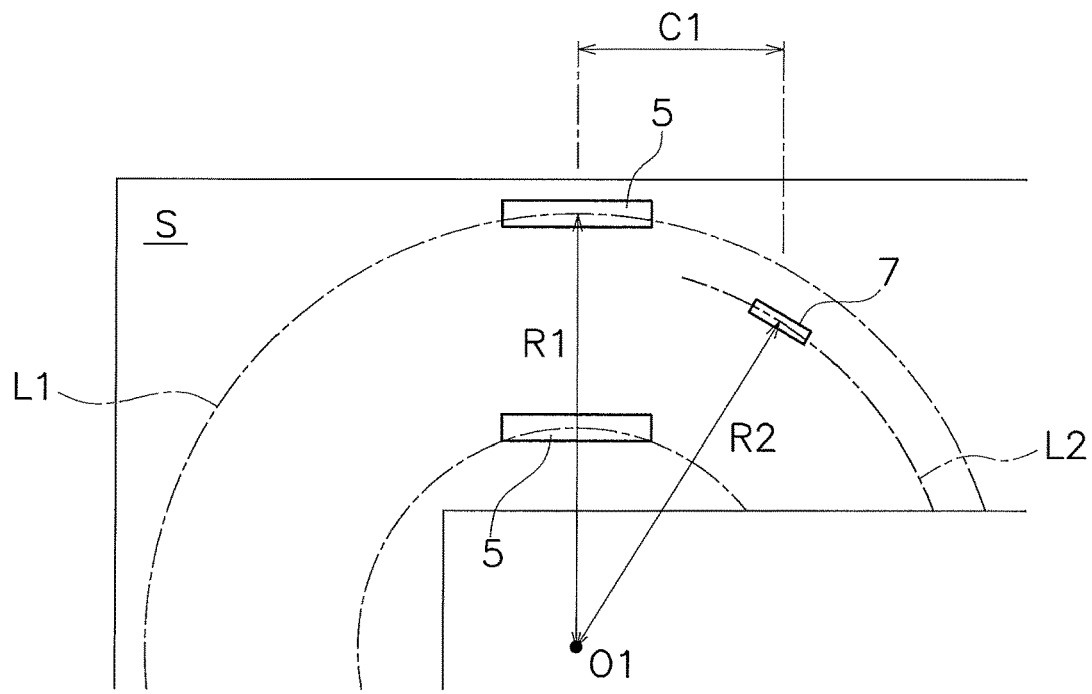
FIG. 4 is a diagram for explaining control performed in movement (turn) of the electric wheelchair employing the first preferred embodiment of the present invention.

When the operating device 13 is herein tilted obliquely forward by the caregiver M1 as described above, the electric wheelchair 1 is moved in either a right front direction or a left front direction. In this case, as shown in FIG. 4, the drive controller 23 controls the rotational speed of each of the pair of motors 12 such that a maximum trail L1 of the pair of front wheels 5 about a predetermined point O1 becomes greater than a maximum trail L2 of the rear wheel 7 about the predetermined point O1.

For example, when the electric wheelchair 1 turns left on an L-shaped road S (see FIG. 4), the drive controller 23 controls the rotational speed of each of the pair of motors 12 such that a first turn radius R1 of the outer one of the pair of front wheels 5 about a first turn center O1 becomes greater than a second turn radius R2 of the rear wheel 7 about the first turn center O1. Thus, the rotational speed of each of the pair of motors 12 is controlled by the drive controller 23, whereby the rotational speed of each of the pair of front wheels 5 is controlled.

In this case, the drive controller 23 sets a difference in rotational speed between the rotational speed of one motor 12 driving the outer-side front wheel 5 and that of the other motor 12 driving the inner-side front wheel 5 such that the first turn radius R1 becomes greater than the second turn radius R2. In other words, the drive controller 23 sets the difference in rotational speed between the rotational speed of the outer-side front wheel 5 and that of the inner-side front wheel 5 through the respective motors 12. Accordingly, the rear wheel 7 is prevented from moving outside the trail of the outer-side front wheel 5 with reference to the first turn center O1. Hence, the electric wheelchair 1 is preferably and suitably enabled to travel in such a situation as a narrow traveling road.

It should be noted that when the operating device 13 is tilted obliquely backward, the drive controller 23 similarly sets the rotational speed of each of the pair of motors 12 so as to control the rotational speed of each of the pair of front wheels 5 such that a maximum trail L1 (R1) of the pair of front wheels 5 about the first turn center O1 becomes greater than a maximum trail L2 (R2) of the rear wheel 7 about the first turn center O1.

Figure 5:
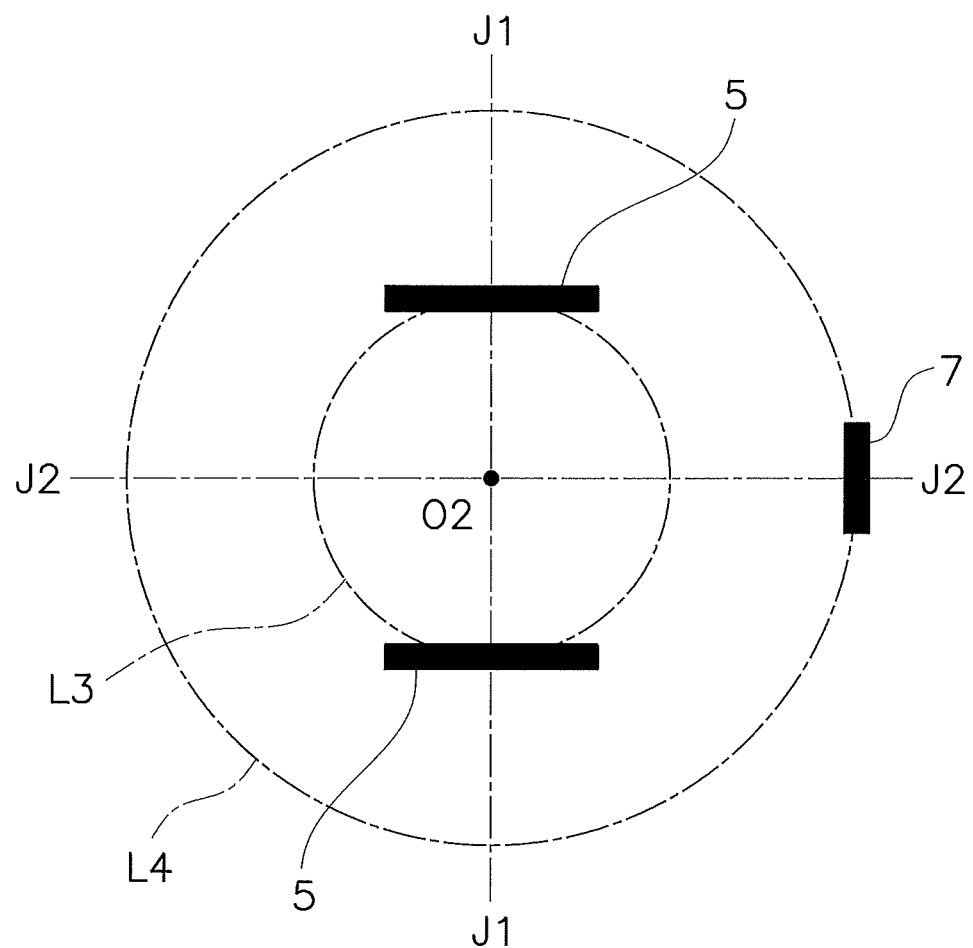
FIG. 5 is a diagram for explaining control performed in movement (neutral turn) of the electric wheelchair employing the first preferred embodiment of the present invention.

On the other hand, when the operating device 13 is tilted sideward by the caregiver M1 as described above, the electric wheelchair 1 performs neutral turn as shown in FIG. 5. In this case, the drive controller 23 controls the rotational speed of each of the pair of motors 12 such that a trail L3 of one front wheel 5 about a predetermined point O2 and that of the other front wheel 5 about the predetermined point O2 overlap with each other. Thus, the rotational speed of each of the pair of motors 12 is controlled by the drive controller 23, whereby the rotational speed of each of the pair of front wheels 5 is controlled.

For example, as shown in FIG. 5, when the electric wheelchair 1 performs neutral turn, the drive controller 23 controls the pair of front wheels 5 such that the outer-side one and the inner-side one of the pair of front wheels 5 are turned about a second turn center O2 while being rotated in opposite directions at an equal rotational speed. Accordingly, the pair of front wheels 5 and the rear wheel 7 form the circular trails L3 and L4, respectively, about the second turn center O2, whereby the direction of the electric wheelchair 1 can be preferably and suitably changed.

(Vehicle Speed Controller)

The vehicle speed controller 27 shown in FIG. 3 controls the pair of motors 12 based on the signals transmitted thereto from the vehicle speed detection sensors 14. For example, the vehicle speed controller 27 calculates the rotational speeds of the front wheels 5 based on those detected by the vehicle speed detection sensors 14, respectively. It should be noted that time information used in calculating the rotational speeds can be obtained from the vehicle speed detection sensors 14, or alternatively, can be measured in the vehicle speed controller 27.

Then, the vehicle speed controller 27 determines whether or not the rotational speeds are less than a predetermined speed. When the rotational speeds are greater than or equal to the predetermined speed, the vehicle speed controller 27 issues a command to the pair of motors 12 so as to cause the pair of motors 12 to regulate the rotational speeds less than the predetermined speed. Accordingly, the vehicle speed of the electric wheelchair 1 can be restricted from getting too high.

(Collision Avoidance Controller)

When at least one of the plural object sensors 15 detects an object related to collision, the collision avoidance controller 29 shown in FIG. 3 controls at least one of the front wheels 5 and the rear wheel 7 so as to avoid the collision. Detailedly, when at least one of the plural object sensors 15 detects an object related to collision, the collision avoidance controller 29 controls the pair of motors 12 so as to avoid the collision.

For example, the collision avoidance controller 29 calculates objective distances/distance from the vehicle body 3 to a moving object and/or a stationary object based on the signals from the respective object sensors 15. Then, the collision avoidance controller 29 determines wither or not each of the objective distance/distances is less than a predetermined distance. When at least one of the objective distance/distances is less than the predetermined distance, the collision avoidance controller 29 issues a command to the pair of motors 12 so as to cause the pair of motors 12 to stop rotation of the pair of front wheels 5. Accordingly, the electric wheelchair 1 can be restricted from colliding with the moving object and/or the stationary object.

(Derailing Avoidance Controller)

When at least one of the step sensors 17 detects an object related to derailing, the derailing avoidance controller 31 shown in FIG. 3 controls at least one of the front wheels 5 and the rear wheel 7 so as to avoid the derailing. Detailedly, when at least one of the step sensors 17 detects an object related to derailing, the derailing avoidance controller 31 controls the pair of motors 12 so as to avoid the derailing.

For example, the derailing avoidance controller 31 recognizes information of the traveling surface S in the traveling direction of the vehicle body 3 based on the signals from the respective step sensors 17. Then, the derailing avoidance controller 31 determines whether or not the step of the traveling surface S has a predetermined height or greater. When it is herein determined that the step of the traveling surface S has the predetermined height or greater, the derailing avoidance controller 31 issues a command to the pair of motors 12 so as to cause the pair of motors 12 to stop rotation of the pair of front wheels 5. Accordingly, it is possible to avoid a situation that the electric wheelchair 1 derails due to the step or collides with the step.

It should be noted that when the height of the step on the traveling surface S is less than the predetermined height, the derailing avoidance controller 31 does not issue the command to the pair of motors 12 so as to cause the pair of motors 12 to stop rotation of the pair of front wheels 5. Accordingly, traveling of the electric wheelchair 1 is continued.

(Motor Stopper)

The motor stopper 32 stops actuation of the pair of motors 12 based on the signal transmitted thereto from the position recognition sensor 19.

For example, the motor stopper 32 determines whether or not the distance between the caregiver M1 and the vehicle body 3 becomes greater than or equal to a predetermined distance based on the signal transmitted thereto from the position recognition sensor 19. When it is herein determined that the distance between the caregiver M1 and the vehicle body 3 becomes greater than or equal to the predetermined distance, the motor stopper 32 issues a command to the pair of motors 12 so as to cause the pair of motors 12 to stop rotation of the pair of front wheels 5. Accordingly, even if the caregiver M1 forgets to turn off the switch portion 16 and separates from the electric wheelchair 1 while the switch portion 16 is being turned on, it is possible to avoid a situation that the electric wheelchair 1 is actuated against the intention of the caregiver M1.

It should be noted that as described above, when the vehicle body 3 (e.g., the first frame portion 3*a*) is provided with the operating device intended for the care receiver M2 (not shown in the drawings) operable by the care receiver M2, the control device 21 similarly executes, as does in response to operating the operating device 13 for the caregiver M1, the aforementioned control in response to operating the operating device intended for the care receiver M2.

Second Preferred Embodiment

The first preferred embodiment has exemplified the configuration of the electric wheelchair 1 employing front wheel drive. However, an electric wheelchair 101 according to a second preferred embodiment employs rear wheel drive. In this regard, the second preferred embodiment is different from the first preferred embodiment. Therefore, in the second preferred embodiment, only constituent elements, which are different from comparative ones in the first preferred embodiment, will be explained without explaining constituent elements that are substantially the same as comparative ones in the first preferred embodiment. It should be noted that when a given constituent element in the second preferred embodiment is the same as comparative one in the first preferred embodiment, a reference sign assigned to the comparative one will be assigned to the given constituent element.

Figure 6A:
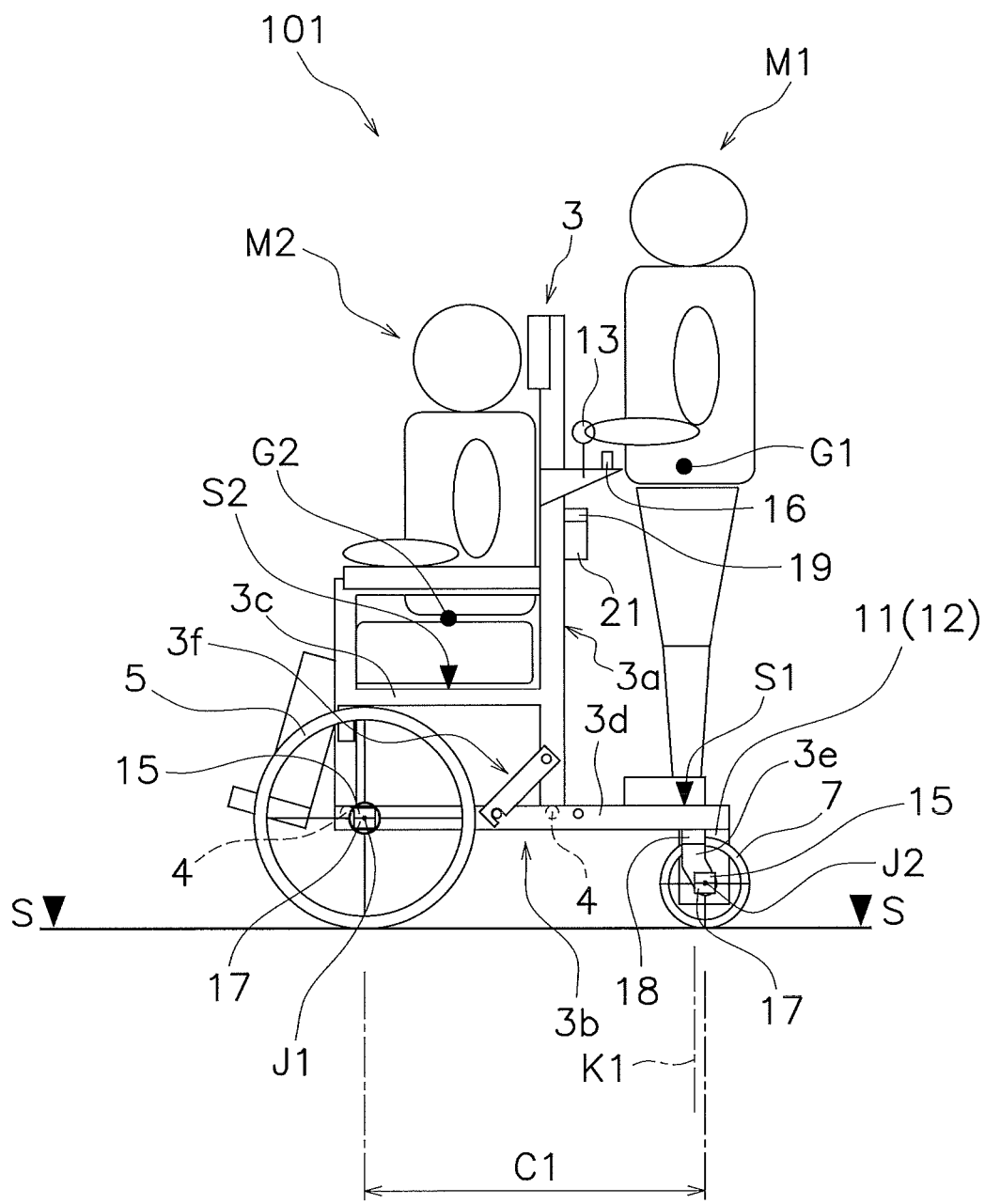
FIG. 6A is a side view of an electric wheelchair employing a second preferred embodiment of the present invention.
Figure 6B:
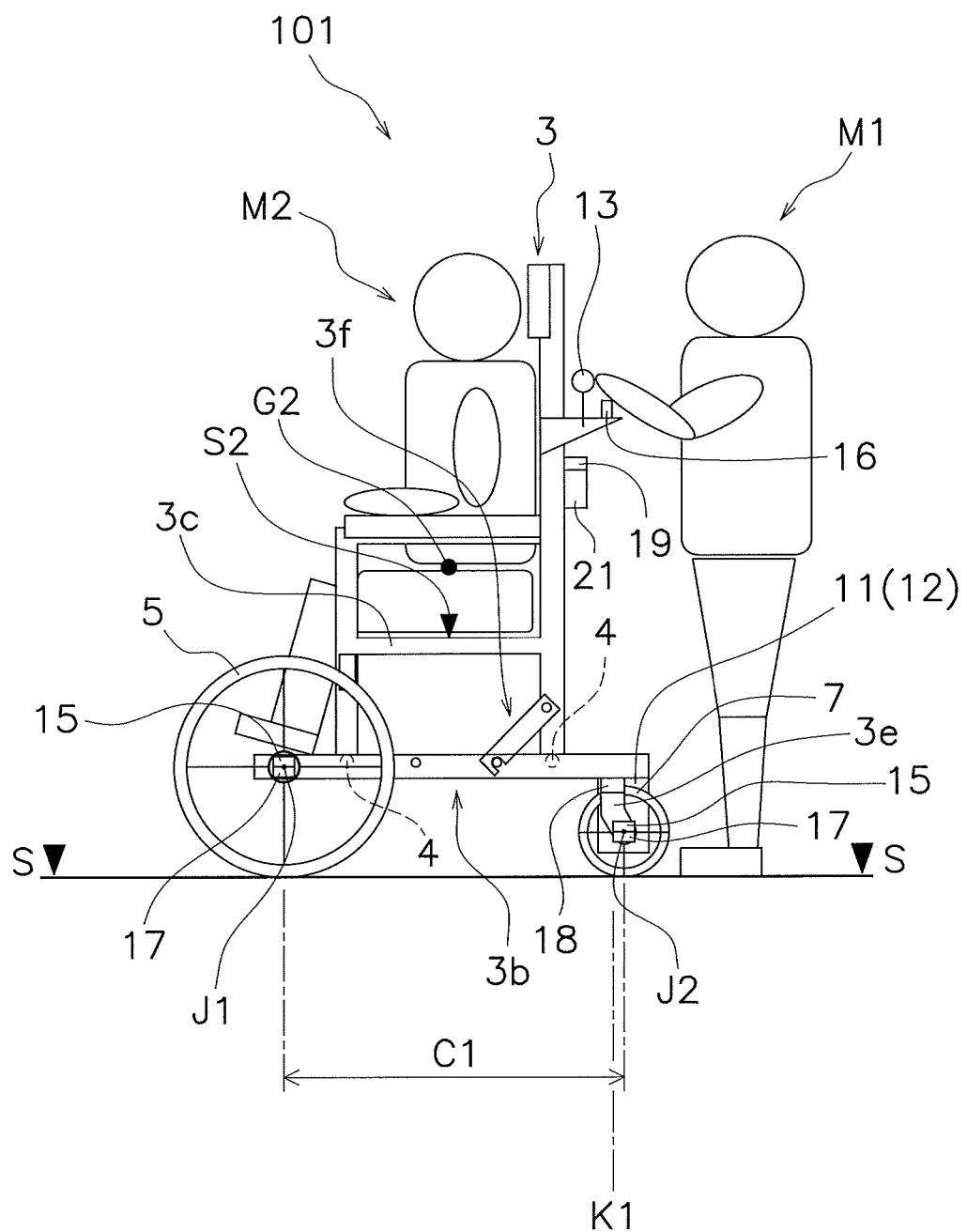
FIG. 6B is a side view of the electric wheelchair employing the second preferred embodiment of the present invention.

In the second preferred embodiment, as shown in FIGS. 6A and 6B, the prime mover 11 (e.g., the motor 12) drives the rear wheel 7. The motor 12 is attached to the vehicle body 3 (e.g., a rear part of the second frame portion 3*b*) and is connected to the rear wheel 7. The electric wheelchair 101 according to the second preferred embodiment employs rear wheel drive. Hence, the pair of front wheels 5 is rotatably attached to the second frame portion 3*b* without being driven by the motors 12.

Additionally, the electric wheelchair 101 further includes the steering device 18. Besides as shown in FIG. 7, the control device 21 further includes a direction controller 25.

The steering device 18 is provided for setting the steering angle of the rear wheel 7. As shown in FIGS. 6A and 6B, the steering device 18 sets the steering angle of the rear wheel 7 by turning the rear wheel 7 about the intersecting axis K1 described above. In other words, when the steering device 18 sets the steering angle of the rear wheel 7, the traveling direction of the electric wheelchair 101 is determined.

The steering device 18 is attached to the vehicle body 3 (e.g., a rear part of the second frame portion 3b). For example, the steering device 18 turns the wheel holding portion 3e about the intersecting axis K1 with respect to the second frame portion 3b in accordance with a direction in which the operating device 13 is operated. Accordingly, the steering angle of the rear wheel 7 is set, and the traveling direction of the electric wheelchair 101 is determined.

Figure 7:
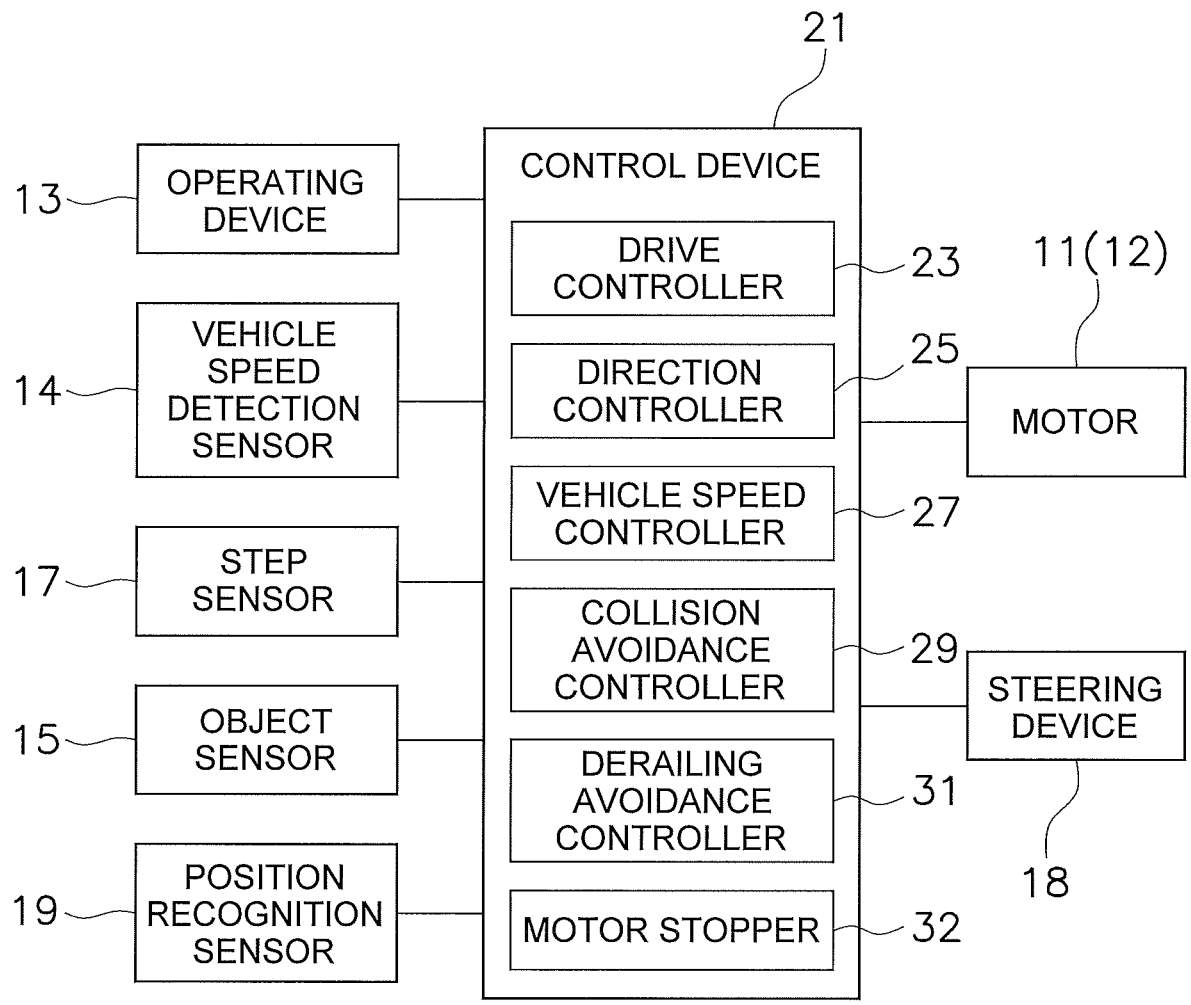
FIG. 7 is a functional block diagram of the electric wheelchair employing the second preferred embodiment of the present invention.

The control device 21 shown in FIG. 7 receives a signal transmitted thereto from the operating device 13, and transmits a control signal to the steering device 18. Accordingly, the steering device 18 is actuated based on the control signal, and the steering angle of the rear wheel 7 is set.

Specifically, the direction controller 25 controls the steering device 18 based on the signal transmitted thereto from the operating device 13. For example, when the operating device 13 is tilted forward or backward by the caregiver M1, the steering device 18 sets the steering angle of the rear wheel 7 (e.g., the wheel holding portion 3e) such that the second rotational axis J2 is arranged substantially in parallel to the first rotational axis J1. Detailedly, the steering device 18 sets the rear wheel 7 (e.g., the wheel holding portion 3e) such that the second rotational axis J2 is arranged substantially in parallel to the first rotational axis J1 and is also arranged substantially in parallel to the traveling surface S.

On the other hand, when the operating device 13 is tilted obliquely forward or obliquely backward by the caregiver M1, the direction controller 25 controls the steering device 18 such that the electric wheelchair 101 travels obliquely forward or obliquely backward. In this case, the steering device 18 sets the rear wheel 7 (e.g., the wheel holding portion 3e) such that the second rotational axis J2 is arranged slantingly to the first rotational axis J1. Detailedly, the steering device 18 sets the rear wheel 7 (e.g., the wheel holding portion 3e) such that the second rotational axis J2 is arranged slantingly to the first rotational axis J1 while being arranged substantially in parallel to the traveling surface S.

When the operating device 13 is herein tilted obliquely forward or obliquely backward by the caregiver M1, similarly to the first preferred embodiment (see FIG. 4), the direction controller 25 controls the steering angle of the rear wheel 7 such that the maximum trail L2 of the rear wheel 7 becomes less than the maximum trail L1 of the pair of front wheels 5.

In this case, the direction controller 25 controls the steering device 18 such that the maximum trail L2 of the rear wheel 7 about the predetermined point O1 becomes less than the maximum trail L1 of the pair of front wheels 5 about the predetermined point O1. For example, when the electric wheelchair 101 turns left on an L-shaped road, the direction controller 25 controls the steering device 18 such that the second turn radius R2 of the rear wheel 7 about the first turn center O1 becomes less than the first turn radius R1 of the outer-side one of the pair of front wheels 5 about the first turn center O1.

Thus, the direction controller 25 controls the steering angle of the rear wheel 7 (the wheel holding portion 3e) through the steering device 18. Accordingly, the rear wheel 7 is prevented from moving outside the trail of the outer-side front wheel 5 with reference to the first turn center O1. Hence, the electric wheelchair 101 is preferably and suitably enabled to travel in such a situation as a narrow traveling road.

Yet on the other hand, when the operating device 13 is tilted sideward by the caregiver M1, similarly to the first preferred embodiment (see FIG. 5), the direction controller 25 controls the steering angle of the rear wheel 7 such that the electric wheelchair 101 performs neutral turn. Detailedly, the direction controller 25 controls the steering device 18 such that the trail L3 of one front wheel 5 about the predetermined point O2 and that of the other front wheel 5 about the predetermined point O2 overlap with each other.

For example, when the electric wheelchair 101 performs neutral turn, the direction controller 25 controls the steering device 18 such that the trail L3 of one front wheel 5 about the second turn center O2 and that of the other front wheel 5 about the second turn center O2 overlap with each other. In this case, the direction controller 25 controls the steering device 18 such that similarity is established between the trail L4 of the rear wheel 7 and the trail L3 of the pair of front wheels 5.

In other words, the direction controller 25 controls the steering device 18 such that the second rotational axis J2 passes through the second turn center O2. Accordingly, the pair of front wheels 5 and the rear wheel 7 form the circular trails L3 and L4, respectively, about the second turn center O2, whereby the direction of the electric wheelchair 101 can be preferably and suitably changed. The second turn center O2 herein corresponds to a midpoint between the pair of front wheels 5 on the first rotational axis J1.

Modifications

Each of the first and second preferred embodiments described above has exemplified the configuration that the caregiver M1 rides on the electric wheel chair 1, 101 while standing on the second frame portion 3b (the riding portion 3d). By contrast, a modification will describe a configuration that the caregiver M1 is capable of riding on the electric wheelchair 1, 101 while seated on a seat portion 3g.

Figure 8A:
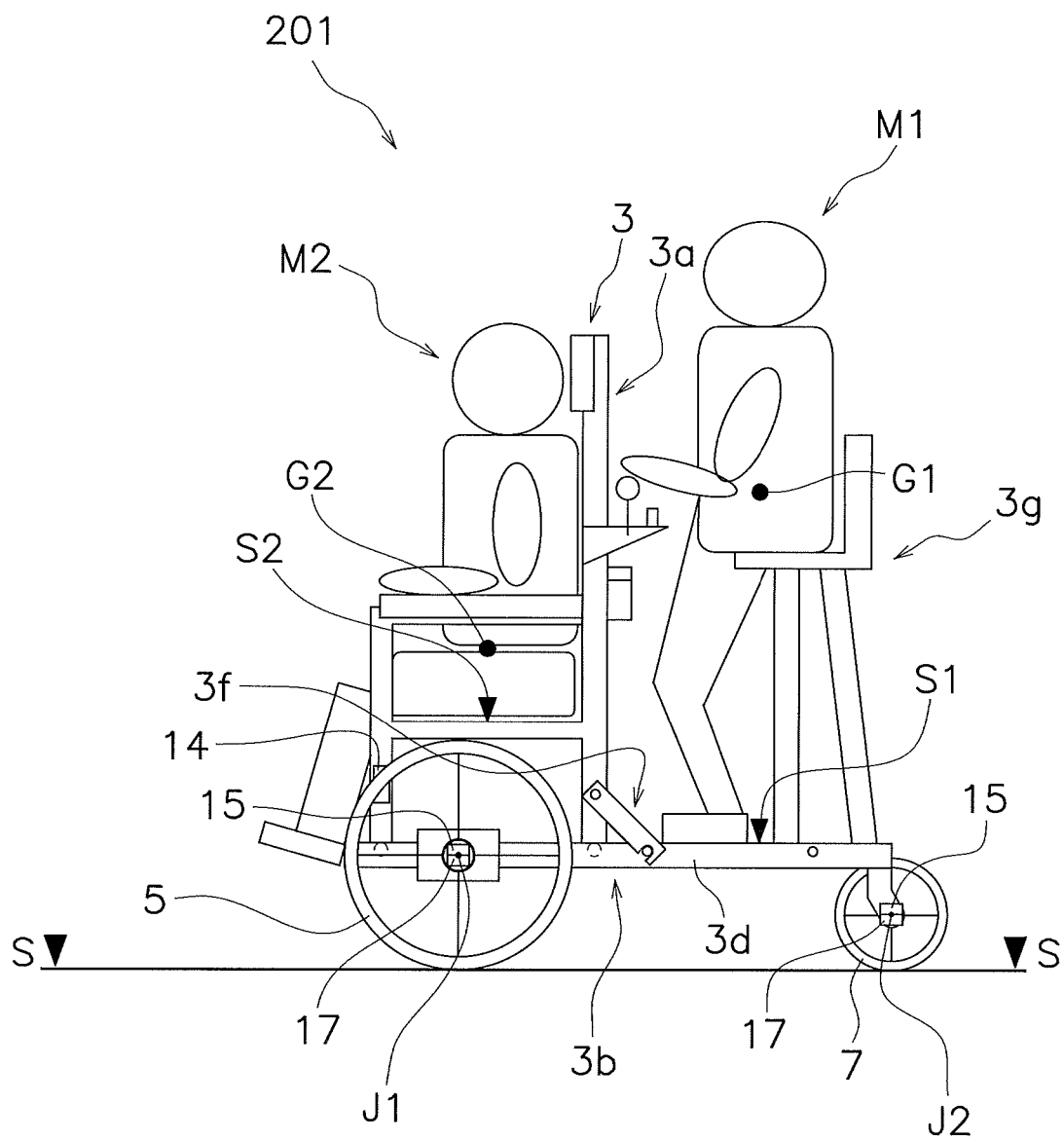
FIG. 8A is a side view of an electric wheelchair exemplified as a modification of the first and second preferred embodiments of the present invention.
Figure 8B:
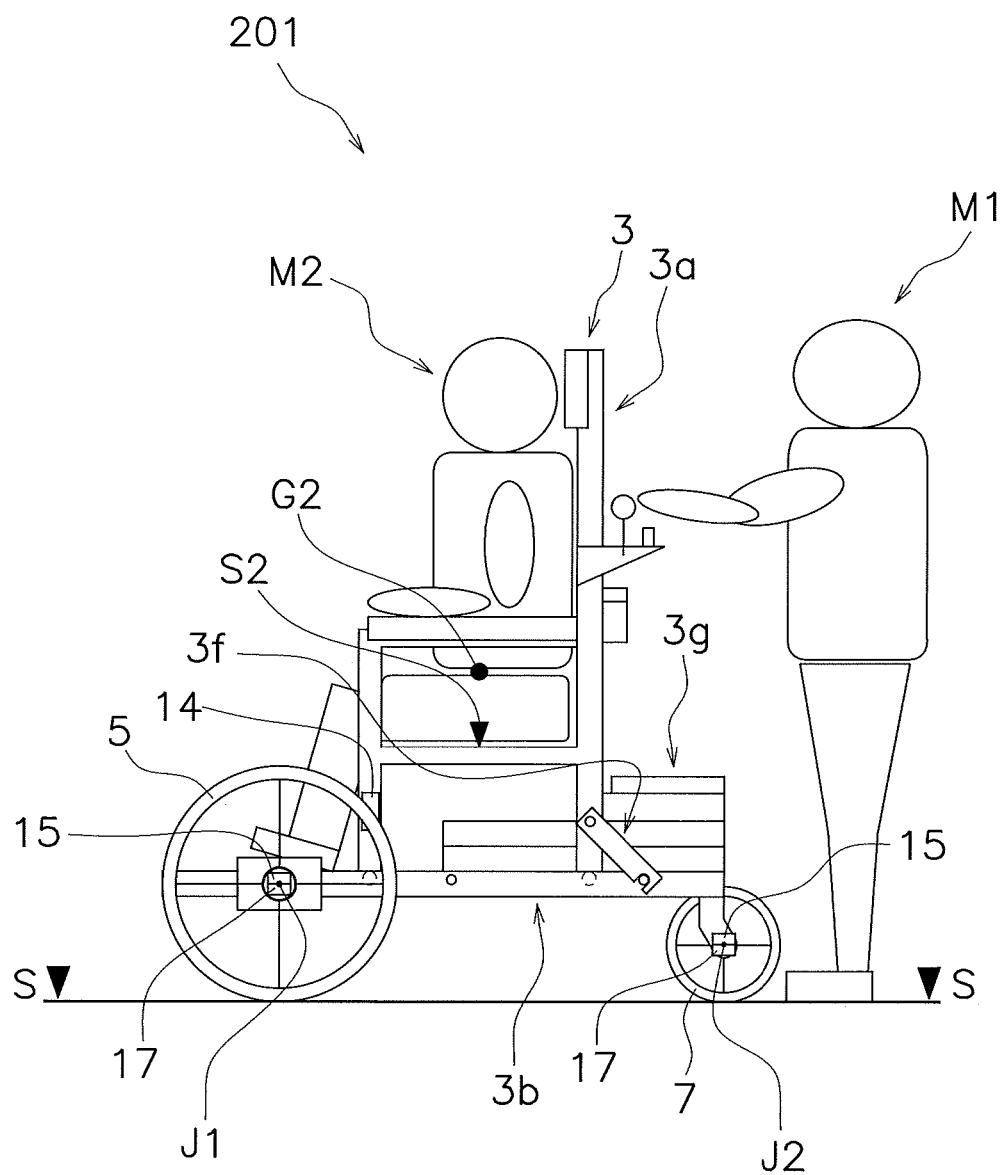
FIG. 8B is a side view of the electric wheelchair exemplified as the modification of the first and second preferred embodiments of the present invention.

In this configuration, as shown in FIGS. 8A and 8B, the vehicle body 3 of an electric wheelchair 201 further includes the seat portion 3g (exemplary support portion) capable of supporting the caregiver M1. It should be noted that the configuration herein explained is applied to the electric wheelchair 1 according to the first preferred embodiment, but is also applicable to the electric wheelchair 101 according to the second preferred embodiment.

The seat portion 3g is attached to the second frame portion 3b so as to be detachable therefrom. For example, as shown in FIG. 8A, the seat portion 3g is attached to the second frame portion 3b in the condition that the first frame portion 3a is disposed in the first position. On the other hand, as shown in FIG. 8B, the seat portion 3g is detached from the second frame portion 3b in the condition that the first frame portion 3a is disposed in the second position.

As shown in FIG. 8A, the caregiver M1 is enabled to be seated on the seat portion 3g in the condition that the first frame portion 3a is disposed in the first position while the seat portion 3g is attached to the second frame portion 3b. In this condition, both the caregiver M1 and the care receiver M2 are enabled to ride on the vehicle body 3, and the caregiver M1 is capable of operating the electric wheelchair 201.

On the other hand, as shown in FIG. 8B, the seat portion 3g is stored by the vehicle body 3 in the condition that the first frame portion 3a is disposed in the second position while the seat portion 3g is detached from the second frame portion 3b. Part of the seat portion 3g is herein stored in the first frame portion 3a. The rest of the seat portion 3g is disposed on the second frame portion 3b. In this condition, the care receiver M2 is enabled to ride on the vehicle body 3, whereas the caregiver M1 is disabled to ride on the vehicle body 3. The caregiver M1 is herein capable of operating the electric wheelchair 201 in the condition that only the care receiver M2 rides on the vehicle body 3.

Figure 9:
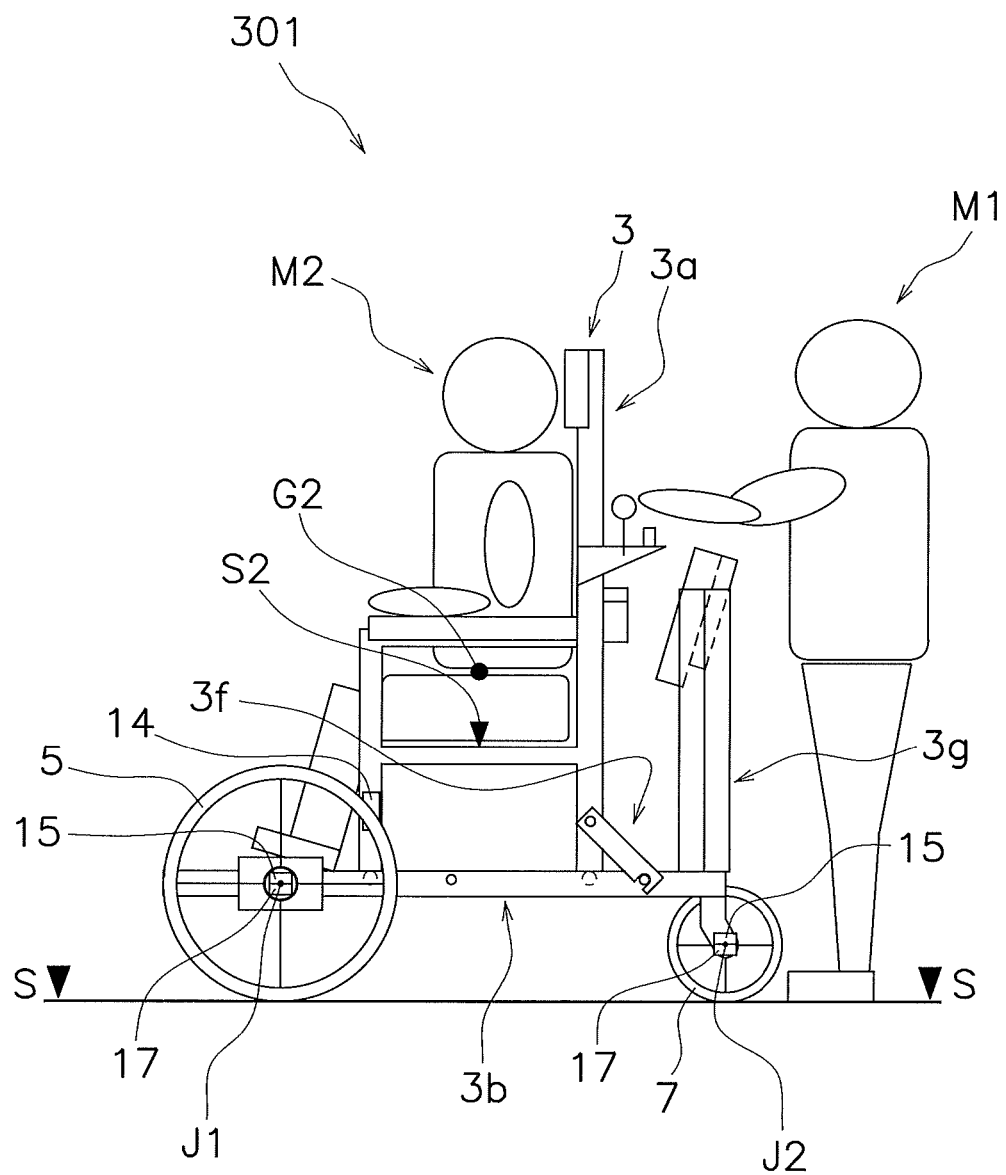
FIG. 9 is a side view of an electric wheelchair exemplified as another modification of the first and second preferred embodiments of the present invention.

It should be noted that in the configuration herein exemplified, the seat portion 3g is stored in the first frame portion 3a, but alternatively, as with an electric wheelchair 301 shown in FIG. 9, the seat portion 3g can be folded while attached to the second frame portion 3b. When the seat portion 3g is thus folded, the first frame portion 3a can be disposed in the second position.

Other Preferred Embodiments (a) Each of the first and second preferred embodiments described above has exemplified the configuration that the number of front wheels 5 is two and the number of rear wheels 7 is one. However, the number of front wheels 5 and the number of rear wheels 7 can be arbitrarily set as long as the total number of front and rear wheels 5 and 7 is plural.

(b) Each of the first and second preferred embodiments described above has exemplified the configuration that the front wheels 5 and the rear wheel 7 are vehicle wheels. However, the front wheels 5 and the rear wheel 7 can be made in the form of at least any one of vehicle wheels, ball casters, crawlers and omni wheels.

It should be noted that when the ball casters are employed, each or both of the first and second rotational axes J1 and J2 is/are defined by the center/centers of a ball/balls composing the ball caster/casters. Alternatively, when the crawlers are employed, each or both of the first and second rotational axes J1 and J2 is/are defined by the rotational center/centers of relevant one/two of a plurality of rotors composing each crawler. Yet alternatively, when the omni wheels are employed, each or both of the first and second rotational axes J1 and J2 is/are defined by the center/centers of gravity in the omni wheel/wheels.

(c) Each of the first and second preferred embodiments described above has exemplified the configuration that the electric wheelchair 1, 101 includes the front wheels 5 and the rear wheel 7. However, at least one intermediate wheel can be further disposed between the front wheels 5 and the rear wheel 7. In this case, the number of intermediate wheels can be arbitrarily set as long as one or more intermediate wheels are provided.

(d) Each of the first and second preferred embodiments described above has exemplified the configuration that the operating device 13 is composed of such a lever member as a joystick. However, the operating device 13 can be a contact input device including a touch screen.

(e) Each of the first and second preferred embodiments described above has exemplified the configuration that the second rotational axis J2 is displaced (set off) from the intersecting axis K1 as seen in a side view. However, the amount of displacement (offset) between the second rotational axis J2 and the intersecting axis K1 can be zero. In this case, for instance, when the motors 12 drive the front wheels 5 as with the first preferred embodiment, it is preferable to steer the rear wheel 7 by the steering device 18 described in the second preferred embodiment.

What is claimed is:

1. A moving device adapted to be actuated by a prime mover, the moving device for allowing a caregiver to ride thereon, the moving device comprising:

a vehicle body including a first frame portion and a second frame portion, the first frame portion configured to allow the caregiver to ride thereon, the second frame portion configured to allow a care receiver to ride thereon; and a plurality of rotating members provided on the first frame portion, the plurality of rotating members rotatable in accordance with movement of the vehicle body, wherein a wheel base defined by the plurality of rotating members is constant, and the second frame portion is provided on the first frame portion such that the second frame portion is movable between a first position in which the caregiver rides on the first frame portion and a second position in which the caregiver is off the first frame portion.

2. The moving device according to claim 1, wherein the vehicle body further includes a support portion, the support portion for supporting the caregiver, the support portion provided on the first frame portion.

3. The moving device according to claim 2, wherein the support portion is attached to an upper part of the first frame portion so as to be detachable therefrom, the support portion detached from and storable in the vehicle body when the caregiver gets off the vehicle body.

4. The moving device according to claim 2, wherein the support portion is foldable when the caregiver gets off the vehicle body.

5. The moving device according to claim 1, wherein the vehicle body further includes a restriction portion, the restriction portion restricting the second frame portion from moving with respect to the first frame portion.

6. The moving device according to claim 1, wherein the plurality of rotating members are formed by at least three rotating members.

7. The moving device according to claim 1, wherein the plurality of rotating members include a first rotating member and a second rotating member, the first rotating member provided on the first frame portion so as to be rotatable about a first rotational axis, the second rotating member provided on the first frame portion so as to be rotatable about a second rotational axis, the second rotational axis disposed at a predetermined interval from the first rotational axis, and the prime mover drives at least one of the first rotating member and the second rotating member.

8. The moving device according to claim 1, wherein the vehicle body is configured such that a center of gravity of the caregiver and a center of gravity of the care receiver are disposed within the wheel base when the caregiver and the care receiver ride on the vehicle body.

9. The moving device according to claim 1, further comprising:

a control device configured to control at least one of the plurality of rotating members.

10. The moving device according to claim 9, further comprising:

a first sensor configured to detect an object which causes displacement of at least one of the plurality of rotating members, wherein the control device includes a first controller, the first controller configured to control the at least one of the plurality of rotating members so as to avoid the displacement when the first sensor detects the object which causes the displacement.

11. The moving device according to claim 9, further comprising:
a second sensor configured to detect an object which contacts the vehicle body, wherein
the control device includes a second controller, the second controller configured to control the at least one of the plurality of rotating members so as to avoid contact of the object when the second sensor detects the object which contacts the vehicle body.

12. The moving device according to claim 9, further comprising:
a third sensor configured to detect a position of the caregiver with respect to the vehicle body, wherein
the control device includes a third controller, the third controller configured to stop the prime mover when a distance between the caregiver and the vehicle body becomes greater than or equal to a predetermined distance.

13. The moving device according to claim 9, further comprising:
a switch portion configured to turn on and off the prime mover.

14. The moving device according to claim 1, wherein
the wheel base extends in a moving direction of the vehicle body, and
the second frame portion is provided on the first frame portion such that the second frame portion is movable along an extending direction of the wheel base between the first position and the second position.

* * * * *